US012509310B2

(12) United States Patent
Ronchi

(10) Patent No.: US 12,509,310 B2
(45) Date of Patent: Dec. 30, 2025

(54) ROTATING STARWHEEL DEVICE WITH VARIABLE OPENING/CLOSING GRIPPERS

(71) Applicant: RONCHI MARIO S.P.A., Gessate (IT)

(72) Inventor: Cesare Ronchi, Gessate (IT)

(73) Assignee: RONCHI MARIO S.P.A., Gessate (IT)

( * ) Notice: Subject to any disclaimer, the term of this patent is extended or adjusted under 35 U.S.C. 154(b) by 107 days.

(21) Appl. No.: 18/515,399

(22) Filed: Nov. 21, 2023

(65) Prior Publication Data
US 2024/0174456 A1 May 30, 2024

(30) Foreign Application Priority Data
Nov. 30, 2022  (IT) .......................... 102022000024738

(51) Int. Cl.
*B65G 47/86* (2006.01)
(52) U.S. Cl.
CPC ................... *B65G 47/847* (2013.01)
(58) Field of Classification Search
CPC .................................................... B65G 47/847
USPC .......................................................... 198/470.1
See application file for complete search history.

(56) References Cited

U.S. PATENT DOCUMENTS

| 2,617,944 | A | * | 11/1952 | Sanchez-Perez | ...... | A61B 6/504 |
| | | | | | | 318/470 |
| 4,984,680 | A | * | 1/1991 | Hamano | .............. | B65G 47/847 |
| | | | | | | 198/803.9 |
| 5,558,200 | A | * | 9/1996 | Whitby | ................ | B65G 47/846 |
| | | | | | | 198/470.1 |
| 2014/0130460 | A1 | * | 5/2014 | Paunesku | ................ | B65B 1/363 |
| | | | | | | 198/470.1 |

OTHER PUBLICATIONS

CN108658026 (Year: 2018).*

* cited by examiner

*Primary Examiner* — Gene O Crawford
*Assistant Examiner* — Lester Rushin, III

(57) ABSTRACT

A starwheel device rotationally transports containers and which has a body rotating about a vertical axis of rotation, and a plurality of grippers, projecting radially at regular intervals from the rotating body and rotating together therewith. Each gripper has a pair of jaws movable towards and away from each other in a tangential direction. A follower actuating member is provided for each gripper, which rotates together with the body and is connected to the jaws of the respective gripper and is movable in the radial direction with respect to the body so as to translationally actuate the jaws. A three-dimensional cam has a variable outer cam profile in contact with each follower member and radially acting on each follower member. The cam profile varies depending on the height of the point of contact between cam and follower member in the vertical direction.

15 Claims, 4 Drawing Sheets

Figure 6A:
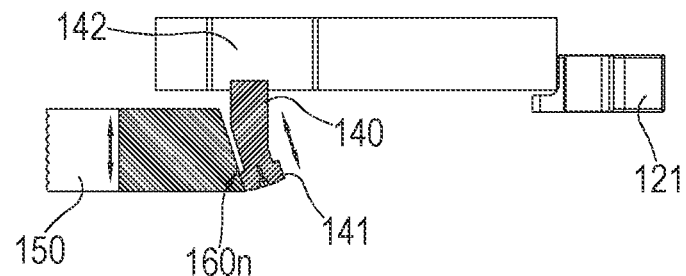

Fig.1
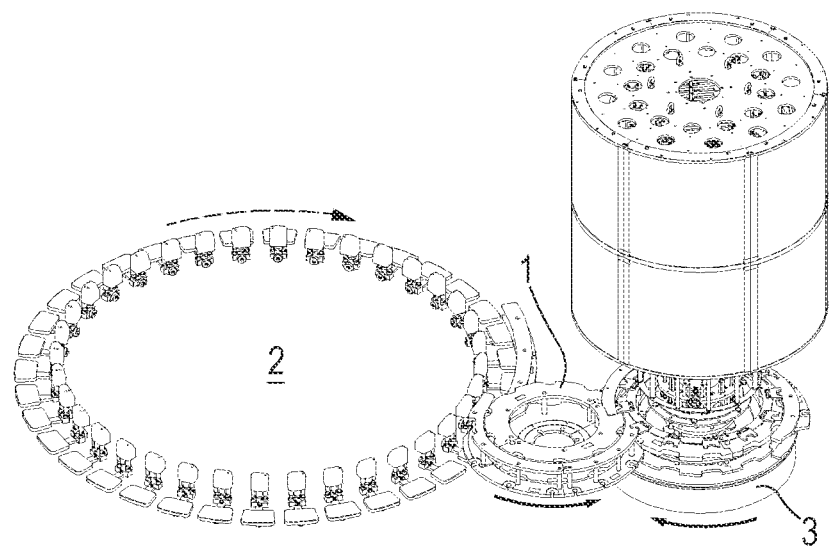
Fig.2
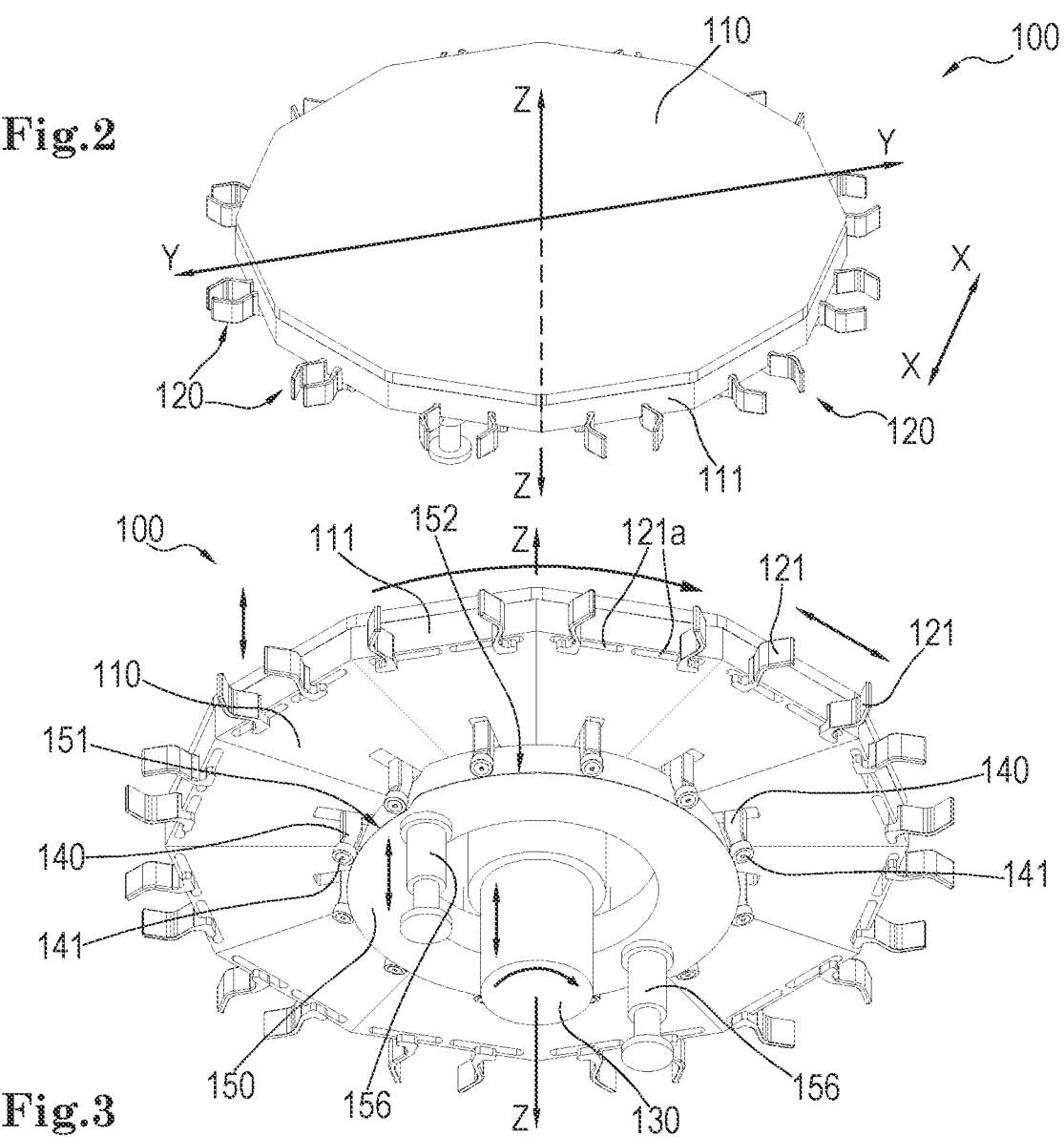
Fig.3

Fig.4
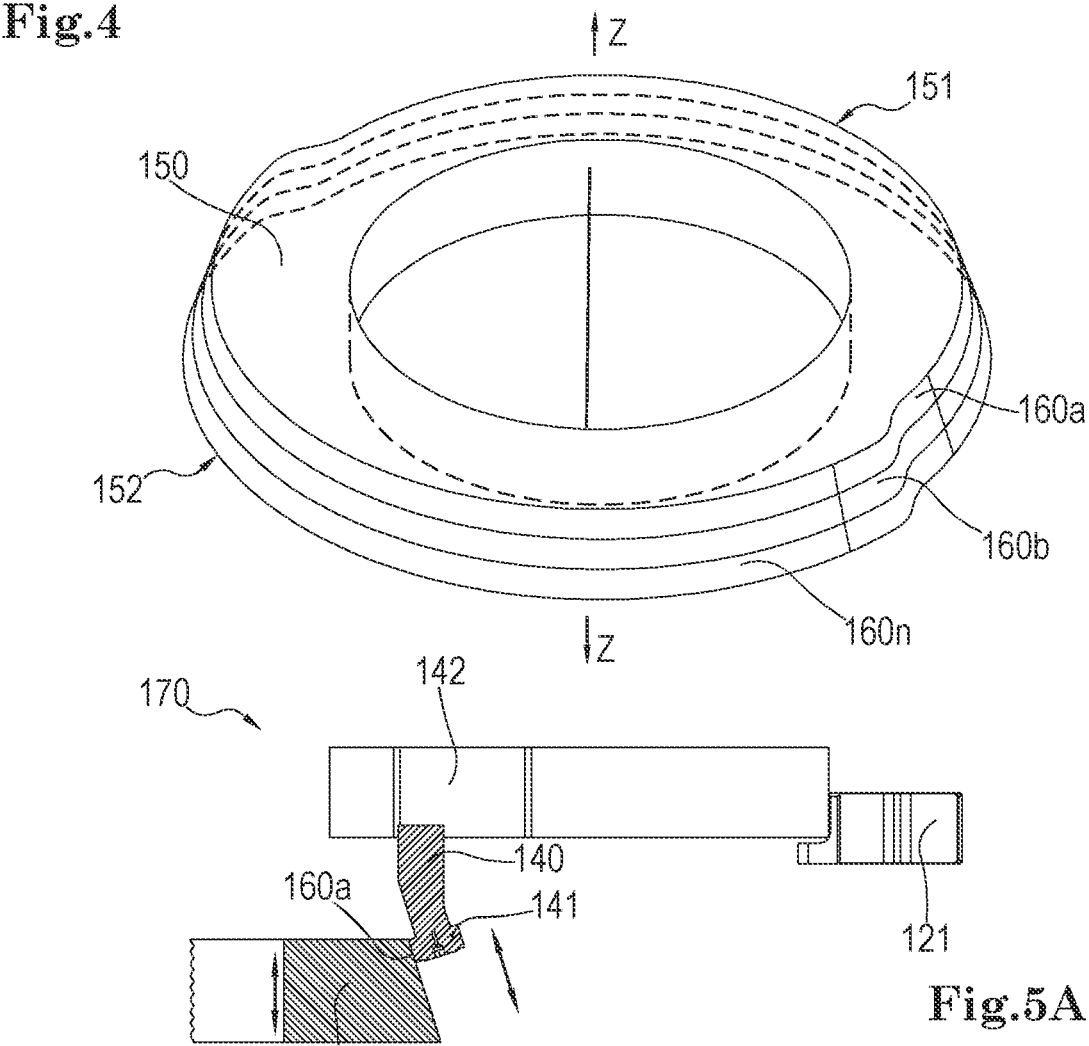
Fig.5A
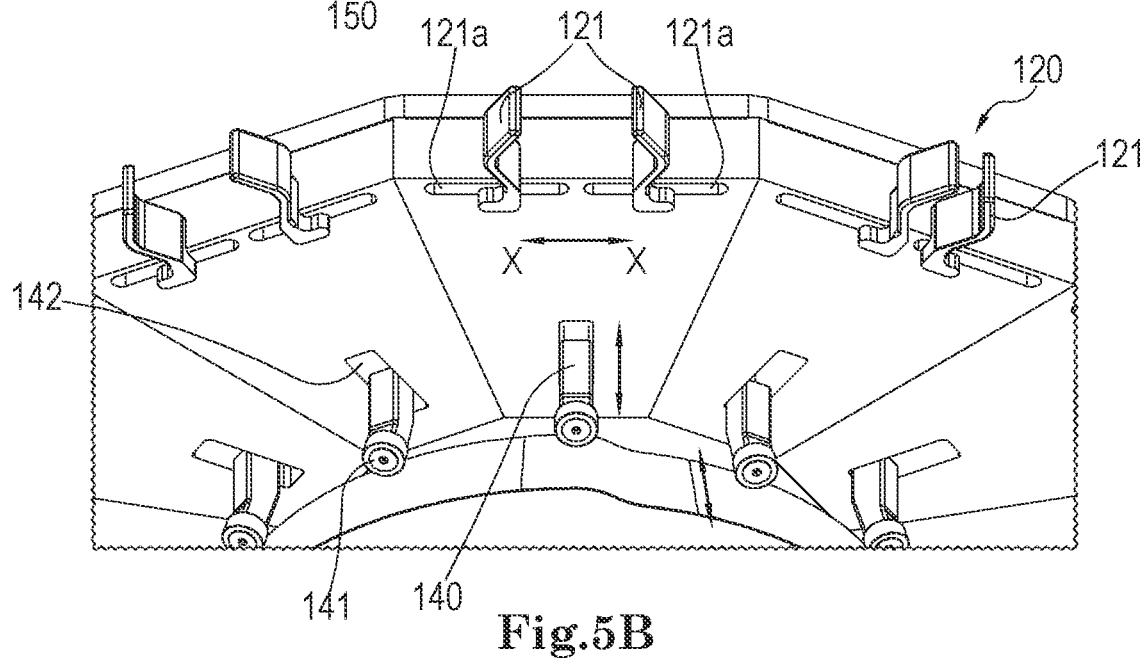
Fig.5B

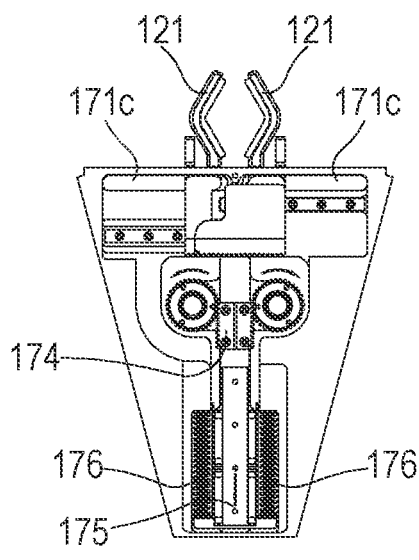
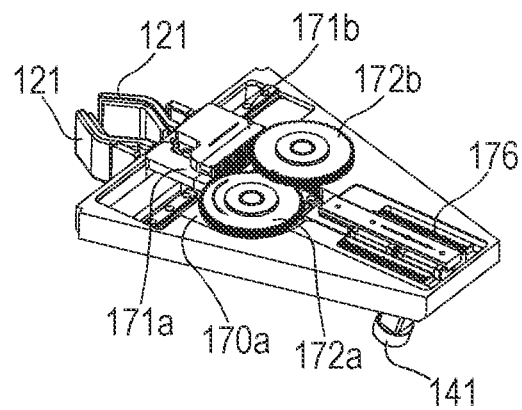
Fig.8A        Fig.8B
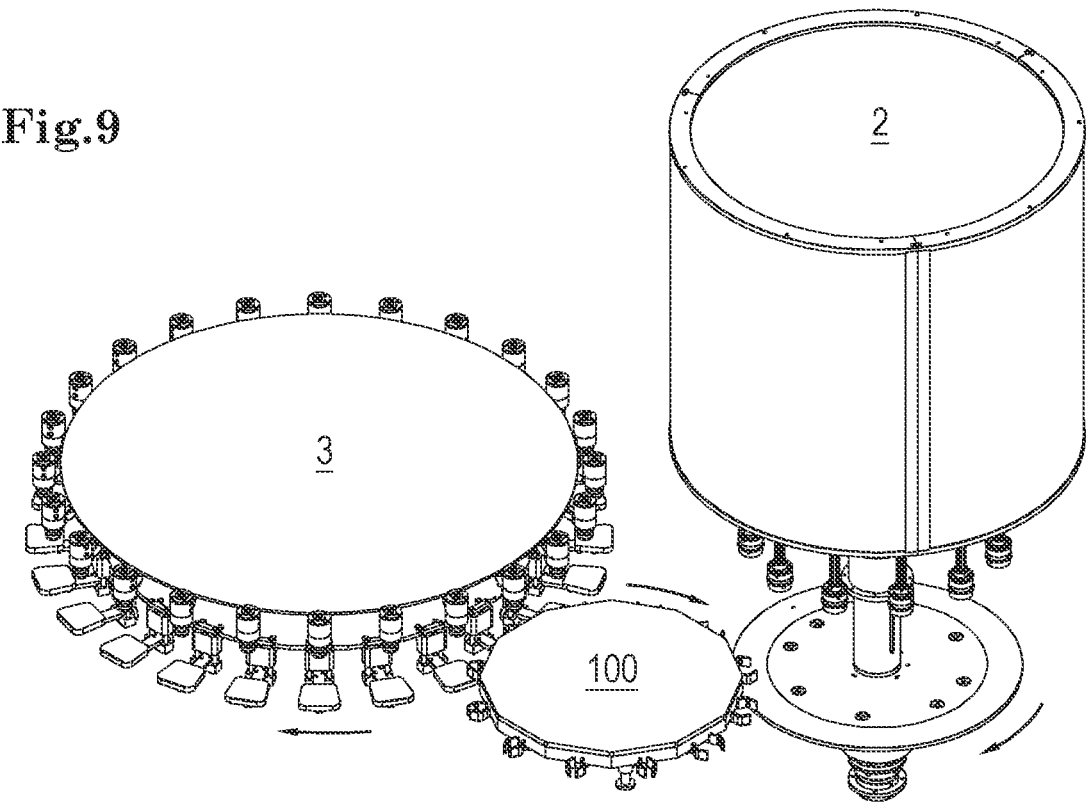
Fig.9

ROTATING STARWHEEL DEVICE WITH VARIABLE OPENING/CLOSING GRIPPERS

The present invention relates to a rotating starwheel device for transferring articles, equipped with variable opening/closing grippers.

It is known, in the technical sector of machines for filling and capping articles such as containers for liquids, fluids and the like, that said machines comprise devices for transferring the articles between one station and another, for example between the filling station and a capping station.

In this context, it is known that the various stations are generally supplied by rotating transport systems, the rotational movement of which is synchronized with the movements of the upstream and downstream devices such as a plurality of filling or capping heads arranged along a circumference.

With reference to FIG. 1, rotating starwheels 1 for transferring the articles, provided with a plurality of hollow vertical-axis seats, are also known, said seats being distributed at a uniform angular distance on an outer circumferential surface thereof and each being designed to house a respective article and transfer it between an upstream station 2 and the following downstream station 3 with said synchronized rotational movement.

These rotating starwheels have the drawback that their seats have a set form so that, when the format of the articles to be transferred changes, the entire starwheel must be replaced with a different starwheel adapted to the article with the different format.

The replacement involves complex disassembly/reassembly operations which must be carried out by specialized personnel, as well as prolonged stoppages of the entire machine, with a reduction in the overall productivity thereof.

The technical problem which is posed, therefore, is that of providing a rotating starwheel device for transporting articles, which can be adapted to different formats of the articles to be transferred without the need for complete replacement, thus reducing the so-called format change-over time and therefore machine stoppage time.

In connection with this problem it is also required that this device should have small dimensions, be easy and inexpensive to produce and assemble and be able to be easily installed at any user location using normal standardized connection means.

These results are obtained according to the present invention by a rotating starwheel device according to the herein disclosed subject matter.

The present invention relates furthermore to a machine for packaging articles, in particular for filling and capping containers, which includes the rotating starwheel device.

Figure 6B:
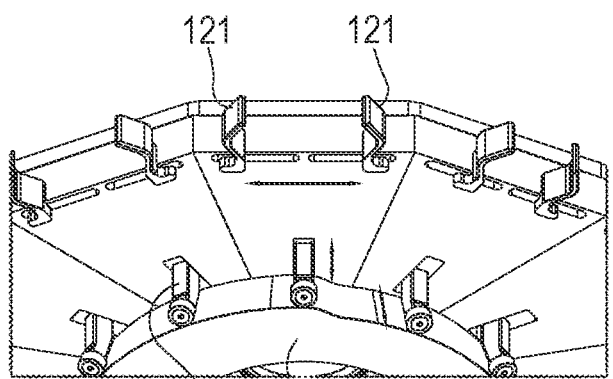
Figures 7A, 7B:
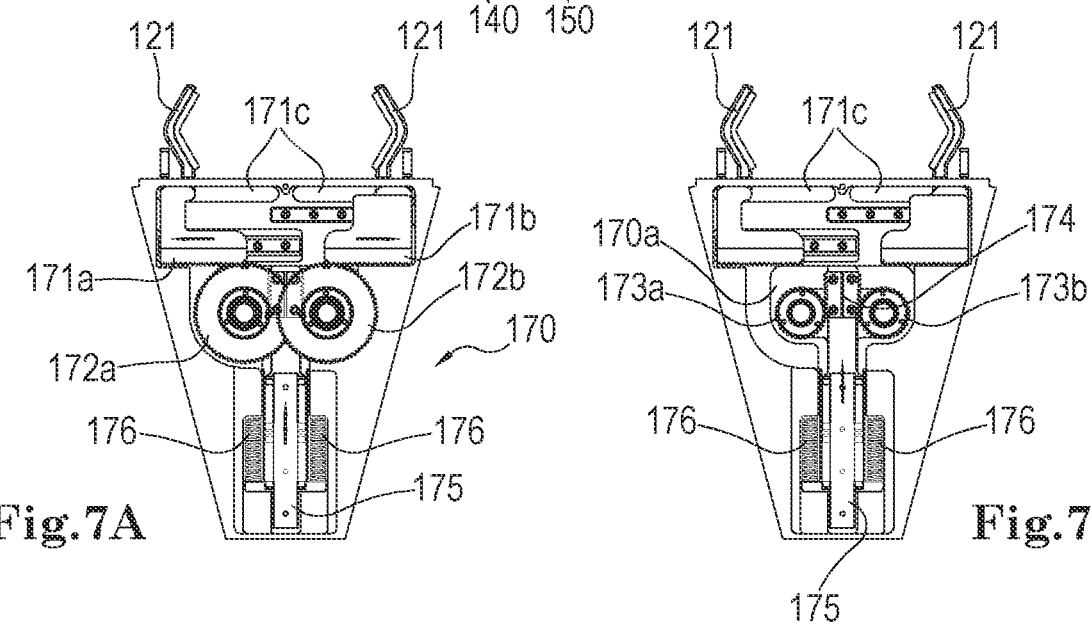
Figure 7C:
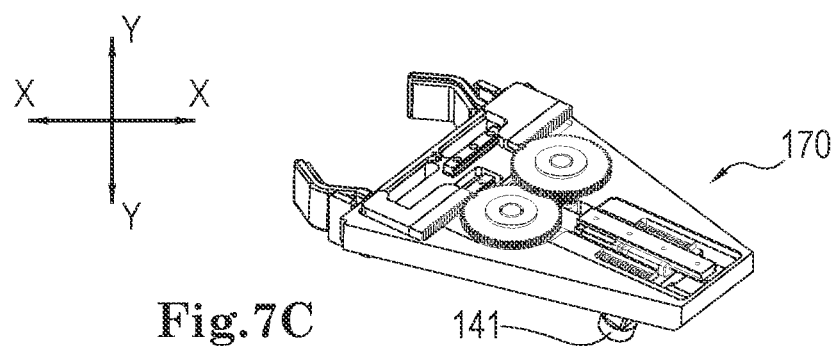

Further details and technical advantages may be obtained from the following description of a non-limiting example of embodiment of the subject of the present invention, provided with reference to the accompanying drawings, in which:

FIG. 1: shows a perspective view of a starwheel 1 according to the prior art, arranged between a filling station 2 and a feeder device 3 of a capping station;

FIG. 2: shows a perspective view, from above, of an embodiment of a starwheel according to the present invention;

FIG. 3: shows a perspective view, from below, of the starwheel according to FIG. 2;

FIG. 4: shows a schematic perspective view of a preferred example of a three-dimensional cam with multiple cam profiles for use in a starwheel according to the invention;

FIG. 5a: shows a schematic cross-sectional view of a first example of relative positioning of the follower member slider/cam for the opening/closing movement of the grippers;

FIG. 5b: shows a partial perspective view, from below, corresponding to the cross-section shown in FIG. 5a;

FIG. 6a: shows a schematic cross-sectional view of a second example of relative positioning of the follower member slider/cam for the opening/closing movement of the grippers;

FIG. 6b: shows a partial perspective view, from below, corresponding to the cross-section shown in FIG. 6a;

FIGS. 7a 7b: show perspective top plan views of a gripper with mechanism for transmission of the movement from the follower member to the jaws of the gripper in an open configuration;

FIG. 7c: shows a view, from above, of the gripper according to FIG. 7a in an open and partially disassembled configuration; and FIG. 8A: shows a view, from above, of the gripper according to FIG. 7a in a closed and partially disassembled configuration;

FIG. 8B: shows a view, from above, of the gripper according to FIG. 7a in a closed configuration;

FIG. 9: shows a perspective view of an example of the arrangement of the starwheel according to the invention between a filling station 2 and a feeder device 3 of a capping station, in a machine for filling and capping containers.

As shown in FIG. 1 and assuming solely for the sake of easier description and without a limiting meaning a set of three reference axes in the following directions, i.e. a vertical/axial direction Z-Z, corresponding to the axis of rotation and the direction of movement of the rotating body and/or the cam, transverse/radial direction Y-Y, corresponding to the direction of movement of a cam follower member/slider; and a general substantially tangential direction X-X, corresponding to the opening/closing direction of a gripper, a preferred example of embodiment of a starwheel 100 according to the invention comprises a rotating body 110, with an outer perimeter inscribed within a preferably polygonal circumference. The body 110 is arranged to rotate about an axis thereof, which in the example coincides with the vertical axis Z-Z, being driven by rotational driving means, for example of the electric gearmotor type (not shown), which operate a vertical-axis shaft 130 rigidly connected to the rotating body 110.

A plurality of grippers 120 (FIGS. 2, 3) are arranged at regular intervals along the outer perimeter of the rotating body 110; in particular, each gripper 120 projects radially from the outer perimetral surface and, in the example, is associated with a respective side 111 of the polygon.

Each gripper comprises a pair of jaws 121 (FIG. 3) oppositely arranged in a tangential direction X-X and movable towards and away from each other between a position where there is a minimum distance and a position where there is a maximum distance.

Each jaw 121 of the gripper is preferably slidable inside a respective seat 121a of the body 110 in both senses of the tangential direction X-X.

Movement means (not shown) for moving the body 110 in the vertical direction Z-Z allow the adjustment of the height of the body 110 and therefore the position of the grippers 120 in the vertical direction Z-Z; preferred embodiments of said driving means comprise one or more recirculating ball screws or trapezoidal screws acting on the shaft 130 or the body 110.

Each gripper 120 can be operated so as to open or close in the tangential direction X-X by a respective follower member 140 projecting at the bottom vertically from the rotating body 110. The follower member is movable radially towards and away from the jaws 121 of the respective gripper 120, to which it is connected via transmission means 170, such that the jaws 121 move in the tangential direction between a spaced open configuration of the gripper and a retracted closed configuration of the gripper.

Each follower member 140 is rotationally coupled with the rotating body 110, with the possibility of being displaced radially with respect thereto, in particular inside a radial slot 142.

Each follower member 140 furthermore is in contact with the outer surface of a cam 150, the outer profile of which acts radially on the follower member 140 so that, during rotation of the body 110, the follower member is made to perform an alternating movement in the radial direction with respect to the rotating body 110, causing an alternating movement in the tangential direction X-X of the jaws 121 of each gripper, which move from a closed gripper configuration into an open gripper configuration and vice versa. As will emerge more clearly below, in the open gripper configuration, the distance between the jaws is smaller than or equal to said maximum distance, while in the closed gripper configuration the distance between the jaws 121 is greater than or equal to said minimum distance.

In the preferred example shown, the follower member 140 is in the form of a roller wheel tappet 141.

According to an advantageous aspect of the invention, the cam 150 is a cam with a three-dimensional form with a height parallel to the vertical axis of rotation Z-Z of the body 110, the outer surface of which defines a variable cam profile depending on the height (or level) in the vertical direction Z-Z of the point of contact between cam 150 and follower member 140.

In other words, the outer cam surface 150 defines a plurality of different plate cams arranged in sequence along the vertical axis Z-Z and acting radially on the follower members 140, with respective cam profiles 160a, 160b, . . . , 160n which are different when there is a variation of the height in the vertical direction Z-Z (or of the coordinate along the axis Z-Z) of the point of contact between the follower member 140 and outer cam surface 150.

Each profile 160a, 160b, . . . , 160n of the cam 150 has a variable radius and comprises for example at least a first sector 151 with a predefined minimum radial dimension (or radius of the base circle), extending over a first suitable circumferential length, and a second sector 152 with a predefined greater radial dimension, extending over a second suitable circumferential length; the two different sectors 151, 152 are designed to cause the periodic opening/closing movement of each gripper during predetermined phases of the rotation of the body 110, necessary for allowing gripping of the article to be picked up in the angular position corresponding to the upstream device 2 and transportation thereof with the gripper closed into the angular position corresponding to the zone for release to the downstream device 3, where the grippers must open for release.

The starwheel 100 also comprises means 156 for moving the cam in the vertical direction Z-Z, for example comprising telescopic uprights which are adjustable heightwise and which support the bottom surface of the three-dimensional cam.

Therefore, by adjusting a relative position in the vertical direction Z-Z of the cam 150 and the body 110 (and therefore of each follower member 140 connected thereto in the vertical direction) via the cam movement means and/or the means for moving the body 110, it is possible to adjust the opening/closing movement of each of the grippers 120 for gripping and releasing the articles during rotation of the starwheel 100, adapting it to different sizes of the containers to be transported.

In greater detail, preferably, the outer surface of the cam is a continuous surface which is gradually tapered (FIG. 4) in the vertical heightwise direction Z-Z, so that the base radius of the cam profile 160a. 160b , , , 160n varies between a minimum, in the example shown at the top, and a maximum at the bottom, such as to define (FIGS. 5a, 5b, 6a, 6b) different minimum and maximum radial distances of the follower member 140 from the axis of rotation Z-Z upon variation of the height of the point of contact of the follower members in the vertical direction Z-Z, with consequent different distances between the jaws 121 in the gripper open and closed conditions, as will emerge more clearly below.

In other words, the cam 150 is a three-dimensional radial cam, with outer profile having a base radius gradually decreasing along the vertical axis of rotation of the body 110 and therefore of the follower members 140.

"Base radius" or "base circle radius" of a given cam profile is understood as meaning the radius of the minimum circumference tangential to the cam profile with its centre on the axis of rotation of the rotating body. It corresponds therefore to the minimum radial distance between the axis Z-Z and the outer cam surface at a given height along the axis Z-Z.

In the preferred example shown, the cam 150 is a cam with a geometrical form which has a substantially frusto-conical outer surface, with axis parallel to the axis of rotation Z-Z of the body 110, and the greater base of which is a planar curve (I.e. in the radial plane) with a variable radius, which defines the cam profile 160n with the maximum base radius.

In this preferred embodiment, the cross-sections of the cam 150 in planes perpendicular to the axis Z-Z constitute superimposed plate cams, which define respective cam profiles 160a, 160b, 160n formed along similar equidistant planar curves with different base radius.

With this preferred configuration, the radial stroke of the cam follower member 140, and therefore the opening stroke of each gripper 120, namely the variation of the distance between the jaws 121 in the open condition and the distance between the jaws in the closed condition of the gripper 120, remains constant for all the cam profiles 160a, 160b, . . . , 160n.

Furthermore, the angular opening (container release) and closing (container gripping) positions remain always the same upon variation in the height of the point of contact between follower member and cam 150 and therefore profile of the cam 160a, 160b, . . . , 160n.

In a preferred variation of embodiment, the cam may be rotatable about the vertical axis Z-Z relative to the body 110 in order to vary the angular position for opening and the angular position for closing the grippers, during setting of the device.

By varying the relative position in the vertical direction Z-Z of the cam 150 and the rotating body 110, and hence of the follower member 140, it is therefore possible to vary the opening/closing movement of each gripper 120 during rotation of the body 110; in particular, by varying the height of the point of contact of the follower member on the outer surface of the cam 150 the distance between the jaws 121 in the open configuration of the gripper and the distance between the jaws 121 in the closed configuration of the gripper 120 is adjusted.

For example, with the cam 150 shown and described above, at a height of the point of contact along the axis Z-Z equal to 7 mm (measured from the bottom surface of the cam 150) the two jaws 121 are positioned at a distance of 45 mm in the closed configuration and at a distance of 105 mm in the open configuration. At a height, instead, of the point of contact along the axis Z-Z equal to 46 mm, a distance of 95 mm between the two jaws 121 in the closed configuration and a distance of 155 mm in the open configuration is obtained (the opening stroke therefore remains constant and equal to 60 mm).

The cam 150 has preferably a coaxial vertical through-hole suitable for allowing insertion of the shaft 130 for rotationally driving the body 110.

With the starwheel assembled, the cam 150 is therefore arranged in a coaxial position underneath the rotating body 110.

Preferably, the transmission means 170 for transmitting the movement from the follower member 140 to the jaws 121 are housed inside a respective seat 170a of the rotating body 110, preferably comprised within the thickness of the body 110 of the starwheel. Preferably the follower member 140 associated with each gripper 120 is moved by the cam profile in a radial direction against the action of resilient means 176, preferably exerting a biasing action towards the axis of rotation Z-Z.

As shown in FIGS. 7A-7B, 7C, 8A, 8B, preferred embodiments of said means 170 for transmitting the movement of the follower member/jaws of the gripper 120 comprise:

a pair of first linear racks 171a, 171b, each extending in a tangential direction, connected to a respective jaw 121 of the gripper 120 and translationally displaceable tangentially inside a slot 171c of the body 110;

the two first racks 171a and 171b are arranged at different heights in the vertical direction Z-Z with respect to the body 110;

each rack is displaced by the rotation of a respective gearwheel 172a, 172b in turn rotationally driven by a respective pinion coaxially rotationally constrained to the respective gearwheel; the pinions 173a, 173b are counter-rotating with respect to each other.

a second linear rack 174 extends radially, is displaceable in both senses of the radial direction Y-Y and meshes with both pinions 173a, 173b so as to cause rotation thereof in opposite directions (clockwise and anti-clockwise);

the second rack 174 is translationally displaced by a slider 175 extending in the radial direction Y-Y and rigidly joined in translation with the follower member 140;

the slider 175 is connected to a pair of springs 176 extending in the radial direction and designed to act as resilient means which push the follower member 140 towards the axis of rotation so as to cause a return stroke of the slider 175 and therefore the second rack 174 in the radial direction.

With this configuration the operating principle of the gripper 120 is as follows:

when the follower member 140 of a gripper 120 reaches the angular position corresponding to the start of the cam profile sector 152 with a greater radius, it is displaced in the radial direction towards the jaws 121, pushing the slider 175 and therefore the second rack 174 towards the jaws 121 of the gripper 120 against the action of the springs 176. The displacement causes the rotation in anti-clockwise/clockwise direction of the pinions 173a, 173b and therefore of the gearwheels 172a, 172b which cause the displacement of the first racks 171a, 171b and the jaws 121 away from each other into the open condition of the gripper 120;

the distance between the jaws 121 in the gripper open condition is determined by the radial dimension of the sector 152 of the cam profile 160. For as long as the follower member slides along said greater-radius sector 152, the jaws 121 are kept at said distance corresponding to the open condition of the gripper 120;

when the follower member 140 reaches an angular position corresponding to the start of the sector 151 of the minimum-radius cam profile (FIGS. 8A, 8B), it is pushed so as to be radially displaced towards the axis Z-Z and away from the jaws 121; this recalls the slider 175 and the second rack 174 which causes the rotation in the opposite clockwise or anti-clockwise direction of the two pinions 172a, 173b and the two gearwheels 172a, 172b which cause the displacement of the two first linear racks 171a, 171b and therefore the jaws 121 towards each other into the predefined distance for the closed condition of the gripper 120, which is maintained for the whole of the smaller-radius sector 151 of the cam profile.

The position at two different heights of the first racks 171a, 171b allows them to be superimposed without interference, while reducing the dimensions of the assembly.

With this configuration the operating principle of the starwheel is as follows:

the form and size of the article 10 to be picked up by the upstream apparatus 2 are checked;

the body 110 of the starwheel 100 is moved in the vertical direction Z-Z via the movement means 130 so as to position the grippers 120 at a height in the vertical direction Z-Z corresponding to the predefined height for gripping the article to be transported;

the cam 150 is moved in the vertical direction Z-Z via the associated movement means 156 so as to bring the point of contact between cam and follower member (FIGS. 5a, 6a) along a cam profile 160a. 160b, , , 160n with the maximum radius so as to produce the opening configuration of the grippers 120 sufficient to allow tangential engagement between the open jaws and the article to be gripped;

the rotation of the rotating body 110 with respect to the cam 150 which is rotationally stationary will cause the alternating movement of the follower member 140 and the jaws 121, which is adjusted by the cam profile selected, with:

preset opening of each gripper 120 along the greater-radius sector, in a predetermined angular position, such as to cause the entry of the article 2 arranged in the upstream station 2 between the open jaws 121, and the following movement of the follower member, pushed by the resilient means 176, into the radially innermost position along the profile sector with smaller radius, so as to cause closing of the gripper around the article 10;

continuing its rotation, the body 110 will position the gripper closed around the article to be transported opposite the downstream device 3 where the object is to be released;

in an angular position corresponding to the downstream station 3, there is a transition of the cam profile to the cam sector with greater radius, which results in the follower member returning into the radially outermost position, with opening of the gripper 120 and release of the article 10 to the downstream station 3 which may remove the article 10 released by the gripper 120.

It is therefore clear how, with the rotating starwheel according to the invention, which has a radial cam with three-dimensional form and variable profile along the heightwise axis, it is possible not only to adjust the movement of each of the grippers 120 for gripping and releasing the articles during rotation of the starwheel, but also to adjust the opening of the grippers so as to be adapted to the different sizes of the containers.

Although described in connection with a number of embodiments and a number of preferred examples of implementation of the invention, it is understood that the scope of protection of the present patent is determined solely by the claims below.

The invention claimed is:

1. A starwheel device for rotationally transporting articles, in particular containers, comprising:
    a rotating body with an outer perimetral surface, the body being arranged to rotate about a vertical axis of rotation, driven by rotational driving means;
    a plurality of grippers, projecting radially at regular intervals from the outer perimetral surface of the rotating body and rotating together with the rotating body; each gripper of the plurality of grippers comprising a pair of jaws movable towards and away from each other in a tangential direction so as to define an open configuration and a closed configuration of the gripper;
    a follower actuating member for said each gripper, which rotates together with the body, wherein each follower actuating member is connected to the jaws of a respective gripper of the plurality of grippers via transmission means and is movable in a radial direction with respect to the body so as to translationally actuate the jaws between the open configuration and the closed configuration of the respective gripper;
    a cam, an outer surface of which is in contact with said each follower actuating member and acts radially on said each follower actuating member so as to cause, according to a cam profile, a radial movement of the follower actuating member and therefore a translation in the tangential direction of the jaws between the gripper open configuration and the gripper closed configuration, during rotation of the body;
wherein the cam is a cam with a three-dimensional form, the outer surface of which has the cam profile variable depending on the height of the point of contact between the cam and the follower actuating member in the vertical direction; and wherein a relative position in the vertical direction of the cam and said each follower actuating member is adjustable via movement means for moving the cam and/or movement means for moving the body,
wherein the outer surface of the cam defines a plurality of different flat cams arranged in sequence along the vertical axis and designed to act radially on the follower actuating members, with respective cam profiles which are different upon variation of the height in the vertical direction of the point of contact between the follower actuating member and the outer surface.

2. The device according to claim 1, wherein the outer perimetral surface of the body defines an outer perimeter of the body inscribed within a circumference, wherein the vertical axis of rotation passes through the centre of the circumference.

3. The device according to the claim 1, wherein each cam profile of the cam has a variable radius and comprises a first sector with a predefined smaller radius, extending over a first circumferential length, and at least a second sector with a predefined greater radius, extending over a second circumferential length; the sectors configured to cause a periodic opening/closing movement of each gripper during predetermined phases of rotation of the body, such as to cause closing of the gripper for gripping an article to be picked up in a first angular position, transportation of an article with the gripper closed as far as a second predefined angular position, and opening of the gripper in the second angular position for releasing the article.

4. The device according to claim 3, wherein the cam is configured so that the angular position for opening the gripper and the angular position for closing the gripper remain the same upon variation in the height of the point of contact between the follower actuating member and cam and therefore of the cam profile.

5. The device according to claim 3, wherein the cam is rotatable about the vertical axis relative to the body in order to vary the angular position for opening and the angular position for closing the grippers, in a setting phase for setting the device.

6. The device according to claim 1, wherein the cam is configured so that, upon variation in the height of the point of contact between said each follower actuating member and the cam, the distance between the jaws in the open configuration of the gripper and the distance between the jaws in the closed configuration of the gripper is varied, while the opening stroke of the jaws of each gripper remains constant.

7. The device according to claim 1, wherein the follower actuating member associated with each gripper is moved by the cam profile in a radial direction against the action of resilient means to bias the follower actuating member towards the axis of rotation.

8. The device according to claim 1, wherein the cam has a coaxial vertical through-hole suitable for allowing insertion of a shaft for rotationally driving the body; and/or wherein the cam is arranged in a coaxial position underneath the rotating body.

9. The device according to claim 1, wherein said transmission means for transmitting the movement from the follower actuating member to the jaws of each gripper include:
    a pair of first linear racks, each extending in a tangential direction, rigidly connected to a respective jaw of the gripper and translationally displaceable in the tangential direction with respect to the rotating body;
    a pair of counter-rotating gearwheels, each meshing with a respective one of the first racks for translational driving thereof;
wherein the gearwheels are rotationally driven in a counter-rotating manner when the follower actuating member moves in a radial direction with respect to the rotating body.

10. The device according to claim 9, wherein the two first racks are arranged at different heights in the vertical direction.

11. The device according to claim 9, wherein the follower actuating member is rigidly joined in translation in the radial direction with a slider which moves a second linear rack extending radially and displaceable in both senses of the radial direction in order to drive the two gearwheels.

12. The device according to claim 11, wherein each gearwheel is rotationally driven by a respective pinion coaxially constrained rotationally to the gearwheel; the pinions being counter-rotating with respect to each other and meshing with said second rack.

13. The device according to claim 1, wherein the cam has a substantially frustoconical continuous outer surface with an axis parallel to the axis of rotation of the body, the greater base of which is a planar curve with a variable radius which defines the cam profile with a maximum base radius; and/or wherein the base radius of the different cam profiles decreases gradually along the vertical axis of rotation of the body; and/or wherein the cross-sections of the cam along planes perpendicular to the axis of rotation are superimposed flat cams which define the respective cam profiles shaped according to similar, equidistant, planar curves with a different base radius.

14. An article packaging machine, in particular a container filling and capping machine, comprising:
   an upstream station,
   a downstream station, and
   a starwheel device according to claim 1, arranged and configured so that, during rotation of the rotating body, each gripper moves from the open configuration into the closed configuration in order to pick up an article at the upstream station, rotationally transport the article retained by the jaws in the closed gripper configuration as far as the downstream station and moves from the closed configuration into the open configuration so as to release the article at the downstream station.

15. The machine according to the claim 14, wherein the upstream station and/or the downstream station is a rotating station and wherein the rotational movement of the rotating body and the movement of the grippers is coordinated with the rotational movement of the upstream station and/or the downstream station.

* * * * *